UNITED STATES PATENT OFFICE 2,324,013

AMINO-SUBSTITUENTS OF SULPHANIL-AMIDE DERIVATIVES

Maurice L. Moore, Drexel Hill, Pa., assignor to Sharp & Dohme, Incorporated, Philadelphia, Pa., a corporation of Maryland No Drawing. Application July 31, 1941,
Serial No. 404,924

16 Claims. (Cl. 260—302)

This invention relates to carboxyacyl-amino-arylsulphonamidothiazoles, in which the carboxyacyl group is the radical remaining when the hydroxyl group is removed from only one of the two or more carboxyl groups of a polycarboxylic acid, and the invention covers such products containing the remaining carboxyl group or groups unaltered as well as with the hydrogen in any of such remaining carboxyl groups replaced by a carboxylate-forming element or radical.

The invention of these products comprises the usefulness of this type of product as intestinal antiseptics for combatting and reducing the concentration of organisms causing intestinal infection.

The products of this invention may be represented by the general formula:

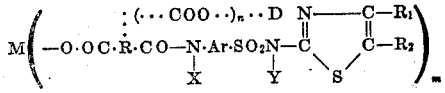

in which M may be hydrogen as well as any other radical capable of combining with a carboxyl radical to form a carboxylate, such as the metals as the alkali metals sodium, potassium, lithium and the like, the alkaline earths as calcium, magnesium, barium and the like, antimony, copper, gold, iron, bismuth and manganese and the like, an alkyl radical, a nitrogen base as ammonium and corresponding radicals of alkyl amines and alkanolamines and the like; and R is the residue of a polycarboxylic acid, aliphatic as well as aromatic, stripped of its carboxyl groups; and D may be hydrogen as well as any of the radicals represented by M and when M is polyvalent D may represent some or all of the valences of M not satisfied by the single carboxyl group to which M is illustrated as being attached; and $n$ may be zero as well as any whole number up to four, whereby the grouping ..(... COO ..)$_n$ .. D represents the carboxyl and the caboxylate groups over two from any polycarboxylic acid having more than two carboxyl groups, and $m$ is a small number equal to the valence of M when $n$ is zero and also when each occurrence of radical D is either hydrogen or any other monovalent radical and also when each occurrence of the radical D (whether mono- or poly-valent) is different from the radical M; and since M and D may be separately polyvalent, $m$ may be one when all of the carboxyl groups in the carboxyacyl radical satisfy all of the valences of such polyvalent radicals M and D; and X may be hydrogen as well as an alkyl radical having, for example, from one to about eight or more carbon atoms as well as an aryl radical such as phenyl and substituted-phenyl; and Ar is an aryl radical (having, as shown in the general formula, a valence linked to nitrogen and a valence linked to sulphur) such as the phenyl (unsubstituted as well as substituted, for example, having nitro, amino, alkyl, carboxyl, sulphonic acid, hydroxy, alkoxy with the alkyl saturated or unsaturated and straight or branched chain, phenyl, halogen such as chlorine, and the like substituents) and naphthyl (similarly unsubstituted as well as substituted) radicals; and Y may be hydrogen as well as an alkyl radical, saturated or unsaturated, for example, methyl, ethyl, propyl, butyl, amyl, allyl, hexyl, heptyl, octyl and the like, or decyl, dodecyl, hexadecyl and the like, as well as an aralkyl radical as benzyl and the like, as well as an aryl radical as phenyl (unsubstituted as well as substituted as noted for Ar above), naphthyl (similarly unsubstituted as well as substituted) and the like; and $R_1$ and $R_2$ may be separately hydrogen as well as a radical such as alkyl, aralkyl and aryl (including diphenyl) each of these types generally as described for Y above, and a nitrogen-containing radical as nitro and amino (unsubstituted and substituted as acyl- and alkyl-), and an oxygenated radical, for example, hydroxy, alkoxy such as methoxy, ethoxy, propoxy, and carbalkoxy such as carbmethoxy, carboxyl and halo-alkyl as chlorethyl and the like, and halogen, for example, chlorine and bromine.

The carboxyacyl group (remaining group when the hydroxyl group is removed from only one of the at least two carboxyl groups of a polycarboxylic acid) may be derived from any desirable polycarboxylic acid, for example, aliphatic and aromatic, such as the aliphatic polycarboxylic acids as the saturated aliphatic polycarboxylic acids such as the dicarboxylic acids, oxalic and malonic acids and their methylene-non-substituted homologues, succinic, glutaric, adipic, pimelic, suberic, azelaic and sebacic acid and the like and derivatives thereof exemplified by malonic acid and its homologues, in any of which at least one of the hydrogens of at least one of the available chain methylene groups is replaced by any desirable substituent, for example, alkyl (saturated as well as unsaturated), hydroxy, amino, carboxyl, and the like. Of such derivatives, the saturated-alkyl-substituted-methylene type is shown by the monoalkyl examples as ethyl-malonic, butyl-malonic, isosuccinic (pyrotartaric or methyl-succinic) and ethyl-succinic acids, and the saturated-dialkyls by dimethyl-malonic and diethyl-malonic acids, and the unsaturated-alkyl by allyl-malonic acid. The hydroxy-substituted-methylene type are exemplified by tartronic (hydroxy-malonic) and malic (hydroxy-succinic, in the three isomeric forms) acids and the polyhydroxy-substituted by the dihydroxy type shown by tartaric (dihydroxy-succinic) acid and the tetrahydroxy example in talomucic acid. The amino-substituted- methylene type is demonstrated by aspartic (aminosuccinic) and glutamic acids. The mixed-substituted-methylene type is shown by citramalic (2-hydroxy-2-methyl butanedioic) and citric acids, the latter serving also to point out the carboxylic-substituted-methylene type.

Unsaturated aliphatic dicarboxylic acids from which the carboxyacyl radical is derived correspond to any of the above mentioned saturated examples having at least four carbon atoms and further particularized by maleic and citraconic (methylmaleic) acids and their respective isomers, fumaric and mesaconic (methylfumaric) acids.

Other aliphatic polycarboxylic acids from which the carboxyacyl radical may be derived are the tribasic, saturated as well as unsaturated, acids exemplified respectively by tricarballylic and aconitic acids and derivatives thereof as those in which any of the methylene or chain hydrogens is replaced by any desirable substituent (as pointed out in relation to the dicarboxylic acids) illustrated by citric acid.

The aromatic (aryl) polycarboxylic acids from which the carboxyacyl radical may be derived may be an aryl dicarboxylic acid as well as one containing up to six carboxyl groups, as mellitic acid, and those having replaceable hydrogen atoms may or may not have other substituents on the aromatic nucleus. Those having no substituents on the aromatic nucleus are illustrated by the isomeric phthalic acids, phthalic (ortho), isophthalic (meta) and terephthalic (para). In those having other substituents on the nucleus, such substituents may be illustrated by alkyl (mono- and di-), alkoxy, hydroxy, halo, nitro and other common groups, for example, xylidic (or uvitic, 5-methyl-1, 3-dicarboxylicbenzene), cumidic (dimethyl-phthalic), hemipic (dimethoxyphthalic), and coccinic (hydroxy-methyl-phthalic) acids.

The invention also includes the preparation of these carboxyacylaminobenzenesulphonamidothiazoles, which are made by heating the desired polycarboxylic acid, its anhydride, or an ester, such as akyl ester, or a monohalide, such as the monochloride or a monochloride of the ester, thereof with the desired aminobenzenesulphonamidothiazole, either merely together or in an inert reaction medium such as an inert solvent, and as in the latter case separating the desired end product or, as in the case of the use of the ester, liberating the end product by hydrolysis, and in any case, where necessary, subjecting it to purification as by recrystallization. Thus, for example, with the aliphatic dicarboxylic acids having less than four carbon atoms in the chain, the alkyl diester of the dicarboxylic acid is reacted with the sulphanilamidothiazole selected. With the aliphatic acids having four and five carbon atoms in the chain and with the aromatic polycarboxylic acids having two carboxyl groups ortho to each other, the desired anhydride is taken as the starting material, while with the aliphatic acids having over five carbon atoms in the chain and with the aromatic acids having no carboxyl group in ortho position to another carboxyl group, the free acid may be heated directly with the selected sulphanilamidothiazole. If desired, the monohalide of the ester of any of the acids may be used as the starting material.

The invention may be illustrated by, but not restricted to, the following examples:

EXAMPLE 1. — 2-$N^4$-oxalylsulphanilamidothiazole.—Five grams of sulphathiazole was mixed with 5.7 grams of ethyl oxalate and heated on a hot plate at 130–150° C. for two hours, with occasional stirring. At the end of this time, the reaction mixture was washed thoroughly with dilute hydrochloric acid and water. The ethyl ester of 2-$N^4$-oxalylsulphanilamidothiazole was obtained in a yield of 86% and after three recrystallizations from dilute alcohol, it melted at 231–232° C. (with decomposition). Then fourteen grams of the ethyl ester of 2-$N^4$-oxalylsulphanilamidothiazole was placed in 150 cc. of a 2.5% solution of sodium hydroxide and heated on the hot plate for one-half hour at 95–100° C. The solution was then decolorized with charcoal ("Darco") and made slightly acid by the addition of concentrated hydrochloric acid. The 2-$N^4$-oxalylsulphanilamidothiazole thus formed was purified by crystallization from dilute alcohol. Yield 71%, melting (with decomposition) at 203–205° C.

EXAMPLE 2.—2-$N^4$-malonylsulphanilamidothiazole.—Using sulphathiazole and ethyl malonate and following the procedure of Example 1, the ethyl ester of 2-$N^4$-malonylsulphanilamidothiazole, melting at 193–194.5° C., was obtained in a similar manner and by like steps converted to 2-$N^4$-malonylsulphanilamidothiazole which, after similar purification, decomposes between 240 and 250° C.

EXAMPLE 3.—2-$N^4$-succinylsulphanilamidothiazole.—3.92 grams of succinic anhydride was added to a boiling suspension of 10 grams of 2-sulphanilamidothiazole in 100 cc. of alcohol. The mixture was then refluxed for five minutes after the addition was complete at which time all of the solids were in solution. The solution was then cooled and diluted with an equal volume of water. The white solid precipitate which formed was filtered and recrystallized from dilute alcohol, yielding 2 - $N^4$ - succinylsulphanilamidothiazole, melting at 184–186° C.

EXAMPLE 4.—2-$N^4$-phthalylsulphanilamidothiazole.—Five grams of phthalic anhydride was added to a boiling suspension of ten grams of sulphathiazole in 100 cc. of alcohol. The reaction product was worked up as in Example 3, yielding 2 - $N^4$ - phthalylsulphanilamidothiazole, which decomposes above 260° C.

EXAMPLE 5.—2-$N^4$-maleylsulphanilamidothiazole.—By replacing the succinic anhydride in Example 3 by the equivalent amount of maleic anhydride, there is obtained 2-$N^4$-maleylsulphanilamidothiazole melting at 213–215° C.

EXAMPLE 6.—2-$N^4$-adipylsulphanilamidothiazole.—A mixture of 10 grams of 2-sulphanilamidothiazole and 5.6 grams of adipic acid was heated at 140–150° C. for one hour. The product was treated with 60 cc. of 10% sodium carbonate to separate the insoluble, undesired by-products and the filtrate neutralized with dilute hydrochloric acid. The 2-$N^4$-adipylsulphanilamidothiazole thus obtained was purified by redissolving in dilute ammonia and slowly precipitating with dilute hydrochloric acid. It melted at 196–197° C. after crystallization from water.

EXAMPLE 7.—2 - $N^4$ - malylsulphanilamido - 4- methyl-thiazole.—A mixture of 20 grams of 2- sulphanilamido-4-methyl-thiazole and 7 grams of malic acid monochloride reacted and processed as in Example 6 (omitting the heating), yields 2-N⁴-malylsulphanilamido-4-methyl-thiazole.

By replacing the ethyl malonate in Example 2 by an equivalent amount of a suitable dialkyl ester of any of the alkyl (saturated as well as unsaturated) derivatives of malonic acid, as ethyl malonic, butyl malonic, dimethyl malonic, diethyl malonic and allyl malonic acids and the like, such as the diethyl ester, by the same procedure there will be obtained the corresponding 2-N⁴-alkyl-malonylsulphanilamidothiazoles, for example, 2-N⁴-ethylmalonylsulphanilamidothiazole,
2-N⁴-butylmalonylsulphanilamidothiazole,
2-N⁴-dimethylmalonylsulphanilamidothiazole,
2-N⁴-diethylmalonylsulphanilamidothiazole, and
2-N⁴-allylmalonylsulphanilamidothiazole.

Similarly, by replacing the ethyl malonate in Example 2 by the equivalent quantity of a similar ester of tartronic acid, there is obtained 2-N⁴-tartronylsulphanilamidothiazole.

By replacing the succinic anhydride in Example 3 by the equivalent quantity of the possible inner anhydrides of other succinic acid derivatives, such as pyrotartaric, ethylsuccinic, maleic and citraconic acid anhydrides and the like or by glutaric anhydride, corresponding carboxyacylsulphanilamidothiazoles are obtained, for example, 2-N⁴-pyrotartarylsulphanilamidothiazole, 2-N⁴-ethylsuccinylsulphanilamidothiazole, 2-N⁴-citraconylsulphanilamidothiazole, and 2-N⁴-glutarylsulphanilamidothiazole. The corresponding carboxyacylsulphanilamidothiazoles derived from the trans-form succinic acid derivatives may be obtained by replacing the ethyl malonate in Example 2 by an equivalent quantity of a corresponding monochloride-ester of such succinic acid derivative or unsaturated isomer and with little or no heating, for example, with the equivalent quantity of the monochloride of the ethyl ester of, for example, fumaric or mesaconic acid.

These compounds and those obtainable from the amino- and hydroxy-substituted derivatives of succinic acid are illustrated by 2-N⁴-malylsulphanilamidothiazole, 2-N⁴-aspartylsulphanilamidothiazole, 2-N⁴-citramalylsulphanilamidothiazole, 2-N⁴-tartarylsulphanilamidothiazole, 2-N⁴-fumarylsulphanilamidothiazole and 2-N⁴-mesaconylsulphanilamidothiazole.

Similarly, there is obtained the following: 2-N⁴-citrylsulphanilamidothiazole, 2-N⁴-glutamylsulphanilamidothiazole, 2-N⁴-talomucylsulphanilamidothiazole, 2-N⁴-tricarballylsulphanilamidothiazole, 2-N⁴-aconitylsulphanilamidothiazole, 2-N⁴-mellitylsulphanilamidothiazole, 2-N⁴-coccinyl-sulphanilamidothiazole, and 2-N⁴-(4-hydroxy-3-carboxyl-benzoyl)-sulphanilamidothiazole.

By replacing the phthalic anhydride of Example 4 by a corresponding equivalent quantity of hemipic anhydride, there is obtained the corresponding carboxyacylsulphanilamidothiazole 2-N⁴-hemipylsulphanilamidothiazole.

Also, by replacing the adipic acid of Example 6 by a corresponding equivalent quantity of isophthalic, terephthalic, xylidic, or cumidic acid, there are obtained the corresponding 2-N⁴-isophthalylsulphanilamidothiazole, 2-N⁴-terephthalylsulphanilamidothiazole, 2-N⁴-xylidylsulphanilamidothiazole, and 2-N⁴-cumidylsulphanilamidothiazole, and the corresponding equivalent quantity of other aliphatic dicarboxylic acids having over five carbon atoms in the chain, such as pimelic, suberic, azelaic, or sebacic acid, there are obtained: 2-N⁴-pimelylsulphanilamidothiazole, 2-N⁴-suberylsulphanilamidothiazole, 2-N⁴-azelaylsulphanilamidothiazole, and 2-N⁴-sebacylsulphanilamidothiazole.

Furthermore, by replacing the 2-sulphanilamidothiazole in any of the examples and in any of the modifications of the examples as just hereinabove described in the various paragraphs following the last example, by any thiazole nuclearly substituted 2-sulphanilamidothiazole having any of the substituents of the type represented by $R_1$ and $R_2$ in the general formula for the products of this invention, there are obtained the corresponding carboxyacylsulphanilamidothiazoles in which there are nuclear substituents on the thiazole ring at the 4- and 5-positions. Among such compounds as well as among all of the various products of the invention, it has been found that those in which the carboxyacylamino radical is para in position to the sulphonamido radical possess particularly desirable properties especially insofar as intestinal antisepsis is concerned. Thus, by varying the sulphanilamidothiazole starting material by employing corresponding materials in which the thiazole nucleus is substituted as just above indicated, there are obtained:

2-N⁴-succinylsulphanilamido-4-methyl-5-hydroxyethyl-thiazole,
2-N⁴-succinylsulphanilamido-4-methyl-thiazole,
2-N⁴-succinylsulphanilamido-5-methyl-thiazole,
2-N⁴-succinylsulphanilamido-4,5-dimethyl-thiazole,
2-N⁴-succinylsulphanilamido-4-methyl-5-phenyl-thiazole,
2-N⁴-succinylsulphanilamido-4-phenyl-thiazole,
2-N⁴-succinylsulphanilamido-4-methyl-5-carboxy-thiazole,
2-N⁴-succinylsulphanilamido-4-ethyl-thiazole,
2-N⁴-succinylsulphanilamido-4-(3,4-dihydroxyphenyl)-thiazole,
2-N⁴-succinylsulphanilamido-carboxy-thiazole,
2-N⁴-succinylsulphanilamido-4-(beta-chlorethyl)-thiazole,
2-N⁴-succinylsulphanilamido-4-methyl-5-carbethoxy-thiazole,
2-(o-succinylaminobenzenesulphonamido)-4-methyl-thiazole,
2-(o-succinylaminobenzenesulphonamido)-thiazole,
2-(m-succinylaminobenzenesulphonamido)-thiazole, and
2-(m-succinylaminobenzenesulphonamido)-4-methyl-thiazole.

To obtain the compounds of the invention in which Y of the structural formula is a positive radical of the type hereinabove disclosed for Y, the sulphanilamidothiazole starting material employed to produce the thiazole nuclearly substituted compounds of the invention as shown above is alkylated or aralkylated or arylated by reaction with the necessary suitable alkylating, aralkylating or arylating agent to attach to the sulphonamido nitrogen the desired positive radical. Alkylating agents such as an alkyl halide, as methyl chloride or ethyl chloride or bromide, or an alkyl sulphate as an alkyl sulphonate, and the like, may be employed to replace the hydrogen represented by Y by the desired alkyl radical, and by using the corresponding aralkylating or arylating agent, by the desired aralkyl or aryl radical. By reacting the thus obtained aminobenzenesulphonalkyl-, aralkyl-, or arylamido thiazole with the desired polycarboxylic acid, there is obtained any desired product of the invention having a positive radical other than hydrogen for the element Y in the general formula, for example, the 2-N⁴-carboxyacylaminobenzenesulphonalkylamidothiazoles as: 2-N⁴-succinylsulphanilylmethylamido-4-methylthiazole, 2-N⁴-succinylsulphanilylethylamido-5-methyl-thiazole, or similar 2-carboxyacylsulphanilylaralkylamido-, or arylamido-thiazoles as 2-N⁴-succinylsulphanilylbenzylamido-thiazole and 2-N⁴-succinylsulphanilylphenylamido-thiazole.

By replacing the succinyl, the carboxyacyl group, in any of the above thiazole-nuclearly substituted, as well as in the N¹-substituted, compounds of the invention, by the carboxyacyl radical derived from any other polycarboxylic acid of the type hereinabove disclosed, the corresponding compound of the invention with the corresponding different carboxyacyl radical is obtained.

From the various exemplifications of the compounds of the invention, there is seen that they may be generally referred to as carboxyacylaminoarylsulphonyl derivatives of aminothiazoles, in which the thiazole portion, as indicated by the thiazole nucleus and the elements $R_1$ and $R_2$ in the general formula, is referred to generally as "thiazoles" to embrace not only those compounds in which the thiazole radical is derived from thiazole itself, but also those in which the thiazole portion is derived from thiazole nuclearly substituted, and in which derivatives, the amino radical through which the thiazole portion is attached to the sulphur, is either unsubstituted or substituted by a positive radical.

The products of the invention, in which M and D of the general formula are hydrogen are generally practicably water soluble, are usually neutral compounds, which become very substantially soluble in water when the free carboxyl group or groups in the product is converted to the carboxylate form by the use of the equivalent amount of alkali or ammonium hydroxide or amine or alkanolamine. Thus, the compounds in which M and D are hydrogen may exhibit a solubility in water within about five or up to about ten per cent, whereas the carboxylate form of the same compound may have a solubility up to about fifty per cent and even higher.

The carboxylate form of any of the compounds of the invention may be prepared, for example, by adding to a small amount of water an excess of the compound over its solubility in water and dissolving the excess by stirring in a sufficient quantity of, for example, anhydrous sodium carbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salt, preferably in aqueous solution, with a suitable soluble salt of the metal, the carboxylate salt of which is desired. The desired carboxylate salt is obtained by resulting double decomposition.

The applicability of the compounds of the invention in intestinal antisepsis, for example, against the coliform type of bacteria, is particularly exemplified by 2-N⁴-succinylsulphanilamidothiazole which has been found to give a prompt drop from one hundred million to as low as only sixty per cubic centimeter in the intestinal flora in dogs.

In general, the carboxyacylsulphanilyl derivatives of the aminothiazoles, in which the carboxyacyl radical is aliphatic and contains four carbon atoms in the aliphatic chain, are especially effective as such intestinal antiseptics for it is possible to build up a high concentration of them in the intestinal tract and without a simultaneously high blood level and yet with substantially no noticeable indication of toxic symptoms. Among these particularly effective compounds are not only those in which the aliphatic chain is saturated, such as those in which the carboxyacyl radical is derived from succinic, malic (the three isomeric forms) aspartic, citramaleic, pyrotartaric, ethylsuccinic, tartaric and ketosuccinic acids and their substituted derivatives, but also those in which the aliphatic chain is unsaturated, such as those in which the carboxyacyl radical is obtained from maleic, citraconic, fumaric and mesaconic acids and their substituted derivatives. The N⁴-carboxyacyl products of the invention show distinctive activity.

These compounds, applicable as intestinal antiseptics, exhibit such activity by the attachment to the various nuclear portions of the compound, of substituents the introduction of which into the basic nuclei leaves the compound substantially non-toxic. Similarly, the metallic element in the compounds used as intestinal antiseptics are such that their inclusion in the compound introduces no toxic characteristic.

The various compounds, used as intestinal antiseptics, are administered orally, either in the form of tablets, capsules or powders of the solid material or as solutions of any desired concentration, exceeding, if desired, 50%.

In the specification and claims the carboxyacyl radical, as hereinabove defined, derived from specific polycarboxylic acids herein named, is designated by replacing the terminal "-ic" in the name of the acid by the ending "-yl" as, for example, the succinyl, oxalyl, malonyl, phthalyl, maleyl, adipyl, glutaryl, aspartyl, tartaryl, fumaryl, mesaconyl, and citryl carboxyacyl radicals and the like, derived respectively from succinic, oxalic, malonic, phthalic, maleic, adipic, glutaric, aspartic, tartaric, fumaric, mesaconic, and citric acids and the like.

In the claims the term carboxyacyl is used in the broad sense so that by its use the individual claim covers not only such compound in which the carboxyl group or groups not linked to the nitrogen of the amino group attached directly to the benzene ring of the compound, may be present in the free form, i. e., as the group —COOH, but also such in which it occurs in the carboxylate form. The expression carboxylate here includes the common carboxylate forms such as the carboxylate salt as well as the carboxylate ester.

The term "benzene" as used in the claims, for example, in the expression "carboxyacylaminobenzenesulphonamidothiazoles" covers the divalent residue —$C_6H_4$—, to one free valence of which the carboxyacylamino group is linked and to the other free valence of which the sulphur of the sulphonyl group is attached so that there are only those two substituents on the benzene ring. On the other hand, the term "phenyl" as used in the claims, for example, "carboxyacylaminophenylsulphonamidothiazoles" is generic to the divalent residue —$C_6H_4$— as just hereinabove defined with respect to the term "benzene," or otherwise referred to as non-substituted-phenyl, and to the substituted-phenyl nucleus in which one or more of the remaining four hydrogen atoms are replaced by additional substituents on the ring.

I claim:

1. Para-carboxyacylaminobenzenesulphonamido-thiazoles prepared for use as a therapeutic and selected from the group consisting of those having the general formula:

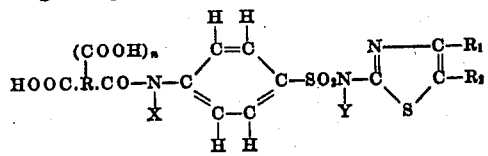

and the carboxylates thereof, in which R is the residue of a polycarboxylic acid stripped of its carboxyl groups; $n$ is selected from zero and any whole number less than five; X and Y are each separately and independently a member of the class consisting of hydrogen and alkyl, aralkyl and aryl radicals; and the thiazole ring together with $R_1$ and $R_2$ attached to that ring represent a member of the class consisting of thiazole radicals.

2. Sulphanilamides of the formula 2-($N^4$-carboxyacylaminobenzenesulphonamido)- thiazoles, prepared for use as a therapeutic.

3. Sulphanilamides of the formula 2-($N^4$-carboxyacylaminobenzenesulphonamido)- thiazoles, in which the carboxyacyl group is aliphatic, prepared for use as a therapeutic.

4. Sulphanilamides of the formula 2-($N^4$-carboxyacylaminobenzenesulphonamido)- thiazoles, in which the carboxyacyl group is saturated aliphatic, prepared for use as a therapeutic.

5. Sulphanilamides of the formula 2-($N^4$-carboxyacylaminobenzenesulphonamido)- thiazoles, in which the carboxyacyl group is saturated aliphatic and is free of substituents on the methylene carbons of its chain, prepared for use as a therapuetic.

6. Sulphanilamides of the formula 2-($N^4$-carboxyacylaminobenzenesulphonamido)- thiazoles, in which the carboxyacyl group is aliphatic and has four carbon atoms in its carbon chain, prepared for use as a therapeutic.

7. Sulphanilamides of the formula 2-($N^4$-carboxyacylaminobenzenesulphonamido)- thiazoles, in which the carboxyacyl group is saturated aliphatic and has four carbon atoms in its carbon chain, prepared for use as a therapeutic.

8. Sulphanilamides of the formula 2-($N^4$-carboxyacylaminobenzenesulphonamido)- thiazoles, in which the carboxyacyl group is saturated aliphatic and has four carbon atoms in its carbon chain and is free of substituents on the methylene carbons of its chain, prepared for use as a therapeutic.

9. 2-$N^4$-succinylsulphanilamido-thiazoles, prepared for use as a therapeutic.

10. Sulphanilamides of the formula 2-($N^4$-carboxyacylaminobenzenesulphonamido)- thiazoles, in which the carboxyacyl group is unsaturated aliphatic, prepared for use as a therapeutic.

11. Sulphanilamides of the formula 2-($N^4$-carboxyacylaminobenzenesulphonamido)- thiazoles, in which the carboxyacyl group is unsaturated aliphatic and is free of substituents on the chain carbons between the carboxyl groups, prepared for use as a therapeutic.

12. 2-$N^4$-maleylsulphanilamidothiazoles, prepared for use as a therapeutic.

13. 2-$N^4$-maleylsulphanilamidothiazole, represented by the structural formula

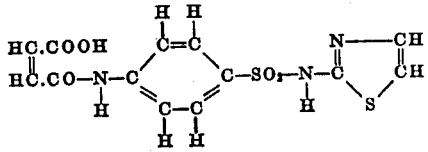

prepared for use as a therapeutic.

14. 2-$N^4$-phthalylsulphanilamidothiazoles, prepared for use as a therapeutic.

15. Sulphanilamides of the formula 2-($N^4$-carboxyacylaminobenzenesulphonamido)- thiazoles, prepared for use as a therapeutic, in which the carboxyacyl group is derived from one of the phthalic acids.

16. Sulphanilamides of the formula 2-($N^4$-carboxyacylaminobenzenesulphonamido)- thiazoles, prepared for use as a therapeutic, in which the carboxyacyl group is derived from a phenyl polycarboxylic acid.

MAURICE L. MOORE.